3,755,471
NONANITROTERPHENYL

Joseph C. Dacons, Washington, D.C., assignor to the United States of America as represented by the Secretary of the Navy No Drawing. Filed Oct. 31, 1963, Ser. No. 320,579
Int. Cl. C07c 79/10
U.S. Cl. 260—645 3 Claims The invention described herein may be manufactured and used by or for the Government of the United States of America for governmental purposes without the payment of any royalties thereon or therefor.

This invention relates to high explosive aromatic nitro compounds and, more particularly, to polynitropolyphenyls having heat resistant properties. Specifically, this invention relates to a new heat resistant high explosive, 2,2′,2″,4,4′,4″,6,6′,6″-nonanitroterphenyl and its method of preparation.

Modern missile and space advances have indicated a definite need for thermally stable explosives which are, nevertheless, sensitive to impact at high temperatures. Certain high energy compounds have been prepared in which ordinarily readily oxidized substituents have been modified so as to cause them to be resistant to oxidation and thus relatively stable at high temperatures. Compounds such as diaminotrinitrobenzene (DATB) and triaminotrinitrobenzene (TATB), for example, have more or less readily oxidizable amino groups but it is believed that the thermal stability of these compounds is due to the hydrogen bonded networks of the amino groups with the oxygens of the nitro groups. As a result, high melting crystalline structures are formed and the thremal stability of the compound is enhanced by strong bonding in crystal latices.

It now appears that thermal instability in substituted polynitroaromatic explosives is due largely to the interaction of nitro groups with the reactive substituents. It follows then, that a polynitroaromatic compound having no substituents reactive with the nitro groups would be thermally stable. The problem which then presents itself is that thermally stable compounds are also generally insensitive to impact and it had appeared, in the past, that a compound which was both thermally stable yet sensitive to impact at high temperatures was not indicated.

It has now been found, despite indications to the contrary, that certain polynitroaromatic compounds may be prepared which are characterized by being stable at high temperatures and yet highly sensitive to impact and that such apparently irreconcilable properties are explained by the type of decomposition which these compounds undergo and in the manner in which the thermal stability measurements are made.

In the polynitropolyphenyl compounds of the invention, there is considerable crowding around the carbon to carbon bonds connecting the rings. These, as well as the carbon to nitro group bonds, are under considerable strain due to van der Waals forces and it appears that the breaking of one of these bonds constitutes the initial step in the thermal decomposition reaction. In reactions of this type, high heats of activation are involved and it is probable that these are responsible for the sensitivity of these compounds to impact. As stated previously, explosive compounds which are thermally stable are generally insensitive to impact yet the compounds of this invention are thermally stable and are highly sensitive to impact. It appears, however, that this may be explained on the basis of activation energies. For example, thermal vacuum stability tests usually deal with temperatures below about 300° C. whereas it has been shown that under the impact hammer "hot spots" with much higher temperatures (up to about 500° C.) occur from which explosions grow. Moreover, it has been demonstrated that, for several explosives, a linear relationship exists between the logarithms of the impact heights and the rates of reaction extrapolated to 500° C. Therefore in a reaction where the heat of activation is high, the temperature coefficient of the reaction rate is large. Therefore it would appear that such a reaction would proceed very slowly in the temperature range where vacuum stability tests are made and very rapidly at temperatures encountered under the impact hammer. Thus it appears that heat resisting capability may be enhanced by increasing heats of activation through the elimination of facile low temperature routes for decomposition. In other words, by eliminating structures and substituents which are easily activated, the heat resisting capability of the total compound is enhanced. For example, the elimination of methyl groups, which are relatively easily activated, and the inclusion of structures and substituents having bonds requiring relatively high heats of activation to break leads to a thermally stable compound. This is apparently the case for the polynitropolyphenyls of this invention but it is to be understood that the invention is not to be construed or bound by such theoretical considerations.

The polynitropolyphenyls of the invention are prepared by the reaction of picryl halides and a halotrinitrobenzene. Picryl halides which may be used are exemplified by picryl chloride, picryl bromide and picryl iodide. Halotrinitrobenzenes which may be employed are exemplified by 1,3-dichloro-2,4,6-trinitrobenzene, and the corresponding dibromo and diiodo compounds. The reaction may involve compounds having the same or different halogens. For example, picryl chloride may be reacted with 1,3-dichloro-2,4,6-trinitrobenzene or either one or both of such compounds may have bromine or iodine substituted for chlorine. The rates of reaction will, of course, vary depending on the particular halogens utilized in the reacting compounds.

The proportions of the reactants are variable and depend, largely, on the rates of reactivity of the compounds utilized with copper. For example, if the picryl halide is the less reactive then it is used in excess in the reaction. Similarly, the amount of copper dust utilized may vary from stoichiometric quantities to an excess of 25 to 50% over the stoichiometric amount.

The sequence in which the reactants are added is of importance. The copper dust and the more reactive halo-compound is added portionwise to an excess of the less reactive halo-compound in solution in the reaction vessel. The picryl halide and the halotrinitrobenzene are reacted under anhydrous conditions in the presence of copper dust in any high boiling organic diluent which is inert to the reaction. Illustrative diluents are mononitrobenzene, toluene, dimethylformamide and nitrotoluene. It is essential that the reaction mixture be kept anhydrous at all times to avoid the formation of trinitrobenzene. The reaction may be carried out under subnormal, normal or supernormal atmospheric conditions and at temperatures ranging from about 90° C. to the boiling point of the diluent. Preferably, however, the reaction is carried out at normal atmospheric pressure and at the lowest practicable temperature. Although the temperature of the reaction is not critical, it is dependent on certain variables such as the nature of the copper dust (i.e. purity, particle size) and the particular mixture of halide utilized. For example, the reaction of picryl chloride with dibromotrinitrobenzene goes at about 95° C. whereas the reaction of picryl chloride with dichlorotrinitrobenzene will go at temperatures as low as 150–170° C.

The following example is intended to illustrate a specific embodiment of the invention and is not to be construed as a delineation of the scope thereof.

EXAMPLE I

An amount of 30 grams of thoroughly dried picryl chloride (1-chloro-2,4,6-trinitrobenzene) was dissolved in 50 ml. of anhydrous nitrobenzene in a 500 ml. 3-neck round bottom flask fitted with a mechanical stirrer and an air cooled condenser and the solution was heated to reflux (210° C.) on a heating mantle. From a dropping funnel fitted with a mechanical stirrer, a slurry of 5.6 grams of 1,3-dichloro-2,4,6-trinitrobenzene and 13 grams of copper dust was added dropwise while stirring vigorously during a 15 minute period. Reflux was continued for an additional ten minutes, the solution was filtered while still hot and the inorganic residue on the filter was washed with several small portions of nitrobenzene. The filtrate and washings were then concentrated to a thick syrup on an oil bath under reduced pressure, diluted by the addition of 350 ml. of toluene and again refluxed and filtered while hot. The filtrate was then filtered through a three inch pad of silicic acid on a 90 mm. sintered glass funnel and washed with toluene until a bright yellow band had moved near the bottom of the filter. The filtrate was evaporated to dryness, the residue diluted with 300 ml. toluene and the mixture refluxed for 15 minutes and again filtered. The product was purified by chromatography on silicic acid-Celite 535 and a yield was obtained which amounted to 2 grams. All analytical and test samples were recrystallized from acetone/n-hexane mixtures or acetonitrile and dried in an Abderhalden drying apparatus over refluxing nitrobenzene for at least four hours. The product was identified as 2,2′,2″,4,4′,4″,6,6′,6″-nonanitroterphenyl by elemental analysis and X-ray molecular weight determination.

EXAMPLE II

This example illustrates a modified and relatively simpler procedure than shown by Example I. Also shown is the fact that the reaction may be scaled-up with no difficulties.

An amount of 311 grams of thoroughly dried picryl chloride was dissolved in 800 ml. of anhydrous nitrobenzene in a 3-neck round bottom flask fitted with a mechanical stirrer and an air cooled condenser and the temperature was raised to 110° C. on an oil bath. A dry mixture of 186 grams of 1,3-dibromo-2,6,6-trinitrobenzene and 143 grams of copper dust was added in approximately 10 gram portions. The portions were added at 2 minute intervals after an initial wait of about ten minutes after the addition of the initial portion. During the addition there was a slight exotherm which was almost sufficient to maintain the pot temperature. The temperature of 110° C. was maintained for 10 minutes after the addition was completed. The reaction mixture was then filtered while still warm and the inorganic residue was thoroughly washed with acetone. The solvents were then removed from the combined filtrate by steam distillation. The aqueous layer was removed by decantation and the dark brown solid was digested for 15 minutes in refluxing methanol. The solid products were then recovered by filtration, dissolved in 3.5 liters of acetone and treated with a mixture of 75 grams activated charcoal and 25 grams Celite 535. The solution was then filtered and the charcoal-Celite pad was washed with acetone. The filtrate was then concentrated with stirring in a steam bath until the volume was approximately 500 ml. At this point, marked precipitation had occurred. The solid was collected by filtration and washed with 400 ml. of a 1:1 mixture of acetone and ether. Upon drying, there was obtained 66 grams of 2,2′,2″,4,4′,4″,6,6′,6″,-nonanitroterphenyl (21% of theoretical).

The product melts, with decomposition, in the range of 440–450° C., has an impact sensitivity of 39 cm. (compared with the impact sensitivity of TNT which is about 160 cm.) and is non-volatile at 210° C. and 1 mm. pressure. Environmental test measurements show that the characteristics of the product as a high explosive, even after exposure to temperature of up to 770° F. for periods of up to ½ hour, are unaffected. The explosive yield is greater than that of TNT.

The product, 2,2′,2″,4,4′,4″,6,6′,6″-nonanitroterphenyl, may be used as a component in mild detonating fuze in missiles and aircraft applications and as a thermally stable booster explosive. Other uses, such as missile stage separation, are apparent.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. The compound 2,2′,2″,4,4′,4″,6,6′,6″-nonanitroterphenyl.

2. The method of preparing polynitropolyphenyls which comprises reacting copper dust with a picryl halide and a dihalotrinitrobenzene under anhydrous conditions in the presence of a diluent therefor.

3. The method of preparing 2,2′,2″,4,4′,4″,6,6′,6″-nonanitroterphenyl which comprises reacting copper dust with a mixture of a picryl halide and a dihalotrinitrobenzene under anhydrous conditions in the presence of an inert diluent.

References Cited

UNITED STATES PATENTS 2,907,799 10/1959 Hughes et al. ---- 260—645 UX

LELAND A. SEBASTIAN, Primary Examiner

U.S. Cl. X.R.

149—105